United States Patent [19]

Kolodziej et al.

[11] Patent Number: 4,668,302
[45] Date of Patent: May 26, 1987

[54] GRILL CLEANING TOOL

[76] Inventors: Francis J. Kolodziej; Ronald L. Calvert, both of 2645 South Fern, Ontario, Calif. 91761

[21] Appl. No.: 715,689

[22] Filed: Mar. 25, 1985

[51] Int. Cl.⁴ ............................................... B08B 1/00
[52] U.S. Cl. ..................................... 134/6; 15/104.04; 15/236 R; 29/81 F
[58] Field of Search ..................... 15/236 R, 104.04; 29/81 F; 134/6

[56] References Cited

U.S. PATENT DOCUMENTS

| | | | |
|---|---|---|---|
| 435,962 | 9/1890 | Bowe | 15/236 R |
| 2,538,435 | 1/1951 | Wegner | 15/236 R X |
| 2,824,323 | 2/1958 | Tos et al. | 15/236 R X |
| 3,667,080 | 6/1972 | Persson | 15/236 R |
| 3,800,354 | 4/1974 | Stephens | 15/236 R |

Primary Examiner—Chris K. Moore
Attorney, Agent, or Firm—Sheldon & Mak

[57] ABSTRACT

A tool for cleaning the wires of a grill comprises a handle with a head having a plurality of recesses in the periphery of the head. The recesses are sized for receiving the wires so that the head closely engages the wires. The recesses are spaced apart so that two wires can simultaneously be received in two recesses. The wires are cleaned by moving the tool along the wires. With this tool, it is possible to clean two wires simultaneously.

8 Claims, 3 Drawing Figures

GRILL CLEANING TOOL

BACKGROUND

The present invention is directed to a tool for cleaning grills of the type commonly used with backyard barbecues.

A distasteful task facing the backyard chef is the baked on fat and other residues of cooking that accumulate on the grill used with backyard barbecues. The usual solution to this problem is to ignore it and allow the residues to burn off. However, this contaminates the next batch of food cooked.

For those chefs that are more fastidious, wire brushing is the current state of art for cleaning a grill. However, wire brushing is difficult, time consuming, and generally ineffective in that only loosely held on contaminants are removed.

For those that appreciate good quality barbecue foods, it is apparent that there is a need for a tool that can effectively and efficiently remove the residue of barbecuing from a grill.

SUMMARY

The present invention is directed to a tool that satisfies this need. The tool is useful for cleaning a grill that has a plurality of parallel, spaced apart wires. The tool has a handle and a head attached to the handle, the head being generally circular and having at least two substantially identical recesses in its periphery. Each recess is sized to receive a grill wire with the head closely engaging the wire for cleaning the grill wire by moving the tool along the wire. The recesses are spaced apart from each other so that two wires can simultaneously fit into a respective recess for simultaneously cleaning two wires.

In a preferred version, the head has five recesses, first, second, third, fourth, and fifth recesses in a clockwise direction. The second and fourth recesses are equidistant from the third recess, which is diametrically opposite the handle, and the first and fifth recesses are also equidistant from the third recess. In use, the first and third recesses can simultaneously receive two wires, the second and fourth recesses can simultaneously receive two wires, and the third and fifth recesses can simultaneously receive two wires. Alternatively, the third recess can receive a single wire.

As will be made clear from the drawings presented below, this preferred configuration allows the tool to easily be used by left handed and right handed persons. Further, the tool effectively cleans the wires of a grill, and because two wires can be cleaned simultaneously, the grill can be quickly cleaned.

DRAWINGS

These and other features, aspects, and advantages of the present invention will become better understood with reference to the following description, appended claims, and accompanying drawings where:

DESCRIPTION

Figure 1:
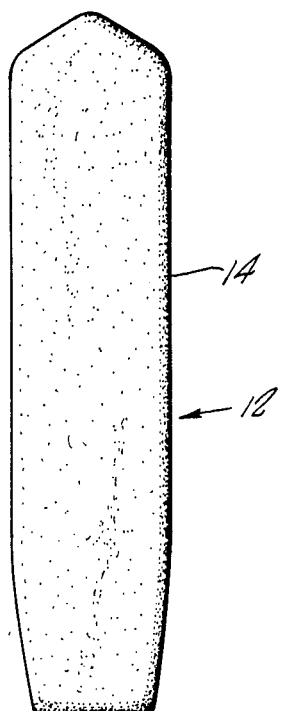
FIG. 1 is a front view of a grill cleaner according to the present invention where a single grill wire is being cleaned.

With reference to the figures, a barbecue grill conventionally comprises a grid having a plurality of parallel wires 10, three wires 10A, 10B and 10C of which are shown in the figures. A tool 12 according to the present invention includes a handle 14 and a generally circular head 16. Preferably the tool 12 is one piece with an integral handle 14 and head 16. As shown in the figures, the tool 12 is planar, i.e. the handle 14 and head 16 are in the same plane.

The tool is made of a rigid material such as a rigid plastic or preferably steel. The tool can be formed by die cutting a sheet of galvanized steel. Preferably the handle 14 is dipped or wrapped in plastic to provide a secure, non-slippery grip.

The head 16 has a circular opening 18 through its middle for supporting the tool when its handle is dipped in plastic. Also the hole 18 allows the tool to hang on a nail.

The outer periphery of the head has a plurality of recesses, recesses 20A, 20B, 20C, 20D, and 20E. Preferably the recesses are identical and are sized to receive a wire 10 so that the head can closely engage a wire for cleaning the wire by moving the tool along the wire. The third recess 20C is diametrically opposite the handle 14. The second 20B and fourth 20D recesses are equidistant from the first recess 20C. The first 20A and fifth 20E recesses are equidistant from the third recess 20C.

Figure 2:
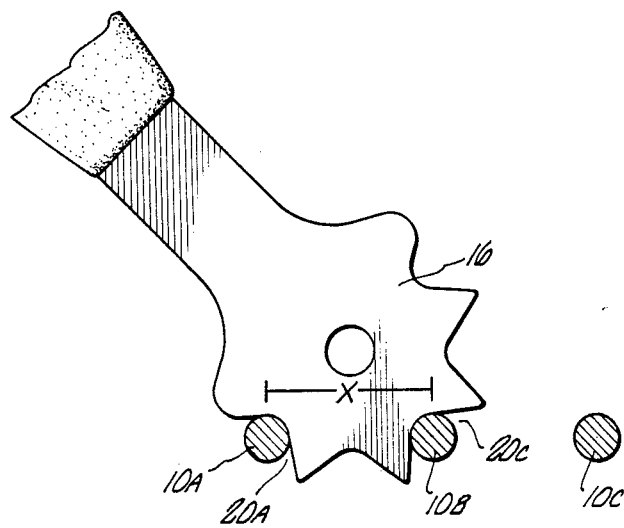
FIG. 2 is a front view of the head portion of the grill cleaner of FIG. 1 where two wires are being simultaneously cleaned with the tool being held by a left handed person.
Figure 3:
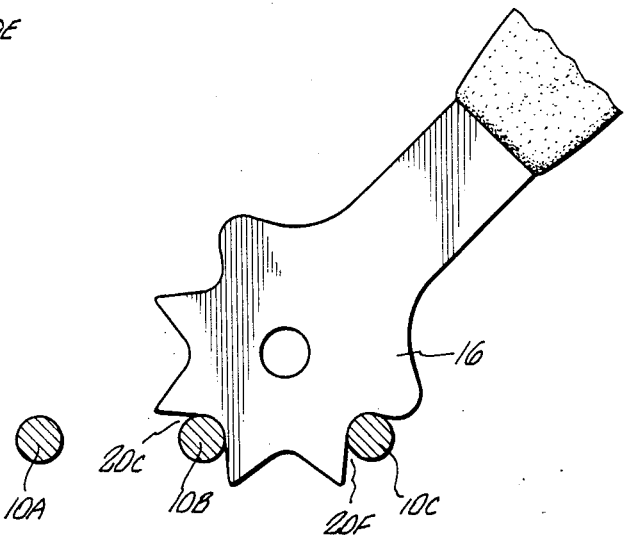
FIG. 3 is a front view of the head portion of the grill cleaner of FIG. 1 where two grill wires are being cleaned simultaneously by a right handed person.

Preferably the recesses 20 are spaced apart so that two wires can simultaneously be in a respective recess so that two wires can simultaneously be cleaned. For example, as shown in FIG. 2 wires 10A and 10B are in recesses 20A and 20C respectively, with the tool being used by a left handed person. As shown in FIG. 3, wires 10B and 10C are in recesses 20C and 20E, respectively, with the tool being used by a right handed person. Alternatively, in a method of using the tool 12 not shown in the figures, two wires can be in recesses 20B and 20D. As shown in FIG. 1, a single wire can be in recess 20C.

In an exemplary version of the tool, the tool can be used for cleaning a grill having wires that are 3/16 inch in diameter and on 11/16 inch centers (distance X in FIG. 2). Such a grill is provided with the popular Weber ™ barbecue. The tool designed for such a grill has recesses 20 having a radius of 3/32 inch with alternate recesses being spaced apart from each other by ½ inch (distance Y in FIG. 1).

The tool 12 has many advantages. It is easy to use, and it is efficient to use because two wires of a grill can be cleaned simultaneously. Further, it can be used at practically any angle.

Other versions of the invention are possible. For example, recesses of different shapes and configurations can be provided on a single tool to accommodate different size grills. For example recesses 20A, 20C, and 20E can be shaped and spaced apart to accommodate one type of grill, while recesses 20B and 20D can be shaped and spaced apart to accommodate a different type of grill.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A tool for cleaning a grill having a plurality of parallel, spaced apart wires comprising:
   (a) a handle; and
   (b) a head attached to the handle, the head being generally circular and having at least two substantially identical recesses in its periphery, each recess being sized to receive a grill wire with the head closely engaging the grill wire for cleaning the grill wire by moving the tool along the wire, the recesses being spaced apart from each other so that two wires can be simultaneously fit into a respective recess for simultaneously cleaning two wires, the head and handle being integral and manufactured as one piece and the tool being planar.

2. The tool of claim 1 wherein the head has at least three recesses and the two recesses that can receive two wires simultaneously have at least one recess therebetween.

3. The tool of claim 2 having at least five recesses and where the five recesses can be matched into at least three pairs of recesses spaced apart from each other to simultaneously receive two wires for cleaning two wires simultaneously.

4. The tool of claim 3 wherein the head has, in a clockwise direction, first, second, third, fourth, and fifth recesses, wherein the first and third recesses can simultaneously receive two wires, the second and fourth recesses can simultaneously receive two wires, and the third and fifth recesses can simultaneously receive two wires.

5. The tool of claim 4 in which the third recess is diametrically opposite the handle for receiving a single wire without any other recess receiving a wire.

6. A tool for cleaning a grill having a plurality of parallel wires comprising:
   (a) a handle; and
   (b) a head attached to the handle, the head being generally circular and having on its outer periphery, in a clockwise direction, first, second, third, fourth, and fifth recesses, the recesses being sized so that a wire can fit into a recess and closely engage the head for cleaning the wire by moving the tool along the wire; the third recess being diametrically opposite the handle, the second and fourth recesses being equally spaced apart from the third recess, and the first and fifth recesses being equally spaced apart from the third recess; the recesses being spaced apart so that two wires can simultaneously be in the first and third recesses, or two wires can simultaneously be in the second and fourth recesses or two wires can simultaneously be in the third and fifth recesses, or a single wire can be in the third recess without any wires being in any other recess, the head and handle being integral and manufactured as one piece by die cutting a piece of metal and the tool being planar.

7. A method for cleaning a grill comprising a plurality of parallel wires, the method comprising the steps of:
   (a) selecting a tool comprising:
      (i) a handle; and
      (ii) a head attached to the handle, the head being generally circular and having at least two substantially identical recesses in its periphery, each recess being sized to receive a grill wire with the head closely engaging the grill wire for cleaning the grill wire by moving the tool along the wire, the recesses being spaced apart from each other so that two wires can each simultaneously fit into a respective recess for simultaneously cleaning the two wires, the head and handle being integral and manufactured as one piece and the tool being planar,
   (b) positioning the tool so that one of the wires of the grill is positioned in one of the recesses and an adjacent wire of the grill is positioned in another recess; and
   (c) moving the tool along the wires with the head closely engaging the wires for cleaning the wires.

8. The tool of claim 1 wherein the handle is dipped or wrapped in plastic to provide a secure, non-slippery grip.

* * * * *